Jan. 26, 1960 R. A. HENNING 2,922,733
CUSHION LINER FOR A CLAMP OPERABLE AT EXTREME TEMPERATURES
Filed Feb. 4, 1955

INVENTOR.
RICHARD A. HENNING
BY
Smith & Tuck

United States Patent Office 2,922,733
Patented Jan. 26, 1960

2,922,733
CUSHION LINER FOR A CLAMP OPERABLE AT EXTREME TEMPERATURES

Richard A. Henning, Seattle, Wash.

Application February 4, 1955, Serial No. 486,139

5 Claims. (Cl. 154—53.6)

My invention relates to clamps for supporting electrical cables and fluid lines in aircraft and the like, and more particularly to a cushioned clamp operable at extreme temperatures. The cushion of this clamp is formed of silicone rubber reinforced with glass fiber. The clamp with such a cushion is adapted to support aircraft cables and lines in firm position and without excessive deterioration of the cushion at temperatures ranging generally from about −75° F. to +500° F.

Current aircraft production raises new problems in many fields and the problem to which the present invention is addressed is the support of cables and lines in high temperature areas in planes. These are commonly located around jet engines, pneumatic turbine drives, rectifier assemblies and other high temperature equipment. A cushioned supporting clamp must withstand continuous temperatures of about 500° F. without deterioration and must accommodate cold temperatures, to about −75° F., without becoming excessively brittle. Such cold conditions may occur when an airplane is sitting on the ground between flights or when flying at high altitudes. The clamp should withstand the high concentration of ozone occurring in high altitude flights. The cushion must be of good dielectric material; must deteriorate slowly under unusual heat, i.e., in the event of fire in the airplane; and it must withstand contact with fluid of a solvent nature, i.e., as when a fuel line should break. The clamp may be subject to extreme vibration tending to move the cables and lines in the clamp and the cushion must then withstand such action without destruction under shearing forces.

The objects of my invention include therefore: to provide a cushioned clamp adapted for use in the extreme temperature ranges and the other operating conditions mentioned above; to support cables and lines in an aircraft or the like and secure them against shifting when subjected to high frequency vibration; to provide maximum tolerance of accident conditions such as occur during a fire or upon the break of a fluid line; and to meet these extreme conditions in an article having a long life and of economical manufacture and installation.

My invention will be best understood, together with additional objectives thereof, from the following description, read with reference to the drawings, in which.

This invention arose in the production of aircraft to meet the need for a cushioned supporting clamp for electrical cables and hydraulic, air, fuel and drain lines in high temperature areas. No previous cushioned clamp was capable of withstanding the working conditions and before this invention an unsatisfactory substitute was made through the use of bare metal support clamps securing conduits wrapped with Teflon (polymerized tetrafluoroethylene) tape.

Rubber was impractical in this construction. First, rubber is attacked by ozone. Further, rubber is usually only rated to −25° or −35° F. and it was desirable to withstand cold temperatures as low as −75° F. without undue brittleness. Also it was desired to withstand continuous temperatures to about 500° F., such as are found around jet engines, and rubber cushioned clamps are at best limited to about 250° F.

At first blush, it would not appear that silicone rubber would meet all of the foregoing operating conditions. Silicone by itself will disintegrate under fluids. There may be large amounts of fluids in compartments in which the clamp is installed if an hydraulic, fuel or drain line breaks. Also, normal silicone is 50% poorer than rubber in tear strength (whereas the final product described herein is 50% better than the rubber cushion of the standard A.N. 742 clamp). The grade of silicone is important and its other properties, i.e., that the material used has no toxic additives and can therefore be used without danger of acrid smoke or dangerous fumes being inhaled by personnel.

I decided that a reinforcing insert was needed in the cushion and glass fiber was selected as an appropriate material, but the glass fiber tested did not adhere to the silicone, although it had the good properties of being fire resistant, dielectric, etc. For example, bulk glass fibers were interlaced in a silicone biscuit, kneaded and molded. This was not a satisfactory design because the silicone would not adhere to the fibers and the mold tore apart. Finally I devised the approach of using glass fiber weaved into a sheet or tape and then impressing the silicone into the weave. This proved feasible when all extraneous moisture and oils were removed and when the weave was not too tight. Some thirty weaves were tried, i.e., plain, satin harness, crowfeet, etc., before a correct weight of weave and correct ply was determined for preimpregnation.

Figure 1:
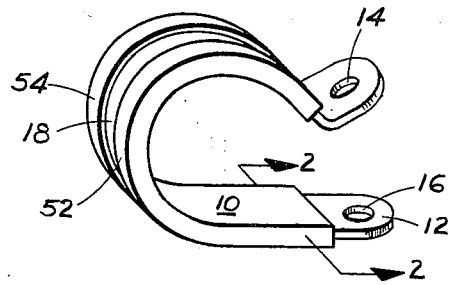
Figure 1 is a perspective view of a clamp showing a specific embodiment of my invention.
Figure 2:
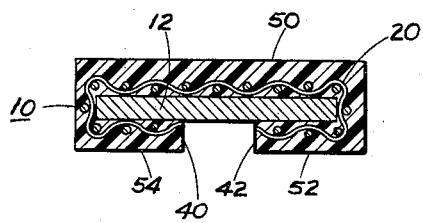
Figure 2 is an enlarged sectional view taken on line 2—2 of Figure 1.

To now describe in detail the invention: My clamp is formed essentially of two parts, a cushion 10 and a metal clamp support body 12. Figure 1 shows one form that such clamp may take in which holes 14 and 16 are provided for a clamping and supporting bolt. Another form of clamp would be a quick action clip type in which case cushion 10 would have ribs on its clamping surface.

The inner diameter of the clamp has been from ⅛ inch to 3 inches. Therefore, the inside of cushion 10 will fit a whole series of metal clamps from ¼ inch diameter to 3 inch diameter. The cavity in the cushion was molded to a height of .040″ (+.005″ −.000″) to fit an aluminum alloy clamp having a thickness of .040″. The same cushion fitted straps of cadmium plated carbon steel from thicknesses of .032″ to .040″. The outer wall of cushion 10 is parted to expose at 18 the manufacturer's complete part number on metal body 12. All burrs and sharp edges should be removed from metal body 12.

Cushion 10 is formed principally of silicone rubber. (The term "silicone rubber" is in general use to describe synthetic rubber formed of silicone gum compounded with fillers.) The following are suggested specifications for the silicone rubber: good cushioning when molded to a thickness of .040″ to .046″; good moldability; 75±5 durometer hardness condition; low shrinkage; below −75° F. brittle point; serviceable at 500° F.; low compression set; serviceable to temperatures between −75° F. and +500° F., and no toxic additives that would cause acrid smoke or dangerous fumes. Of course, the general characteristic of silicone should be present in having good dielectric properties, low water absorption, and very good ozone deterioration properties. Clamps made according to these specifications were tested at temperatures of about 650° F. for a period as long as many normal airplane missions without apparent change in the cushion. Dow Corning silocone #675 has been found to be a suitable material meeting the above specifications and having a plasticity (Williams) of about 130 mils and a specific gravity at 25° C. (press vulcanized stock) of 1.3.

A requirement of the clamps is the retention of cables and lines without tear or longitudinal movement thereon when subject to substantial stresses including high frequency vibration. A particular glass fiber insert has been found to add the necessary tear strength; and, whereas normal silicone is 50% poorer than rubber in tear strength, this reinforced cushion clamp is 50% better than the rubber cushion of standard A.N. 742 clamp. The reinforcement of the glass fiber inside the cushion holds down deformation normally caused by fluids such as engine oils and fuels and returns the cushion to its original condition as the fluid is removed and the cushion redries. No other silicone cushion known exhibits this property.

Figure 6:
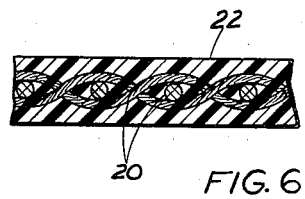
Figure 6 is a greatly enlarged view showing the prefabrication coating on the fibers of the reinforcing insert.
Figure 5:
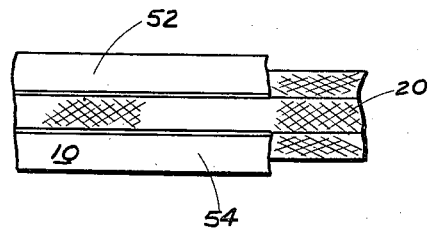
Figure 5 is an enlarged plan view in fragmentary form with the cushion broken away at one end to show the reinforcing insert.
Figure 3:
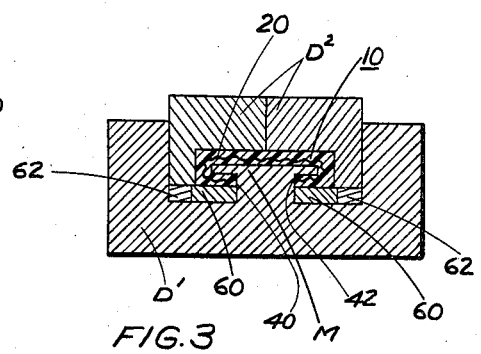
Figure 3 is an enlarged sectional view of the cushion of the clamp as it is formed in a mold.

One of the very extensive tests on this clamp was the application of 2000° F. flame test for 5 minutes and the clamp withstood this heat without shorting a clamped electrical cable. Even though the clamp was burned to an ash, the ash was retained by the glass fiber reinforcement as to exhibit its normal dielectric properties. In the flame test, the clamp was self-extinguishing in less than one minute. The glass fiber selected is a particular weave, No. 128 one-ply satin harness, which has properties peculiar only to a weave of this nature in permitting impregnation between the threads of a silicone coating. Other weaves found operable, although less desirable, are No. 120 satin harness and No. 138 crowfoot. As stated before, early experiments with the glass fiber were unsatisfactory because the silicone would not adhere to the glass fiber causing tearing under force. The weave selected solves the problem by permitting slicone material to pass through the interstices of the weave as shown in Figure 6. Glass fiber normally contains some oils and/or moisture which resists adhesion of silicone particles. This surface condition is alleviated so as to form an absolutely clean, dry, surface by heating in an oven. The glass fiber is then "frictioned and skimmed," e.g., coated both sides with .005 to .010 thickness of silicone rubber. A silicone having a plasticity (Williams scale) of between about 120 and 180 mils and a specific gravity at 25° C. (before curing) of about 2.0 to 2.15 is suitable for this coating. Dow Corning silicones 160 and 161 and Kirkhill silicone 970–A–185 have been found to be suitable materials for this coating. When the glass fiber insert 20 is frictioned with such coating 22, then the strip will bond with the silicone forming the remainder of the cushion 10.

The process of molding will not be described in detail as it is known in the art and may take several forms. However, the production at present takes the following form: The frictioned strip 20 is wrapped on a mandrel M to the edges of the rib spacing the mandrel from the remainder of the female die D¹. The previously frictioned and skimmed strip 20 is wrapped about mandrel M and secured against unwinding by insert bars 60 backed up by wedges 62. A silicone strip is placed on top of the mandrel and when the two-part male die D² is forced in place the silicone flows around the strip to fill the cavity in the mold. In the molding, the cushion is divided at 40 and 42 so that the cushion 10 and glass fiber insert 20 have C-shaped cross sections.

Figure 4:
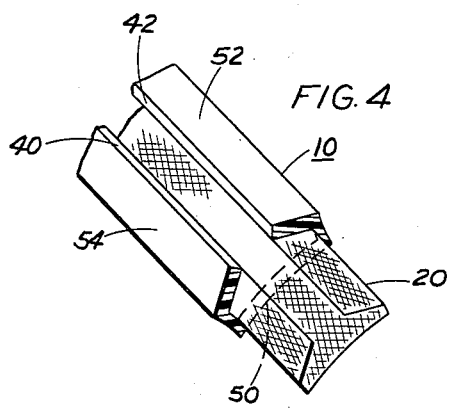
Figure 4 is a fragmentary perspective view of the cushion with an extension showing the position of a reinforcing insert therein.

The particular shape of molds was selected so that, due to tensions in cushion 10 during cooling, the base of the C at 50 will assume a concave shape and so that the lip portions 52, 54 will appear at an angle to each other, as shown in Figure 4. The reason for forming the mold to obtain this distortion is to obtain firm gripping of the edges of lips 52, 54 on the outside surface of clamp body 12 when member 12 is inserted in cushion 10 and causes surface 50 to straighten. This is very important because the silicone cushion is normally so flexible that cushion 10 could readily be dislodged during handling if it were not tensed. Rubber cushions are normally more rigid so that this problem does not occur in other clamps.

Another feature which has been found highly desirable is to position the weave of the glass fiber at a 45-degree bias. Forces applied to the clamp during use which tend to shift it longitudinally of the supported cable or line will thus be opposed by all thread of the glass fiber. Resistance to tear hence will be substantially doubled relative the resistance of only half of the threads if the glass fiber were aligned with half of the threads disposed at right angles to the line of force.

Very extensive tests have been made of this clamp to ascertain that it met all of the requirements above mentioned. The tests approximated the conditions to which the clamp might be subjected, including a reasonable safety factor. The clamp has met these tests and therefore it is believed that the invention has made a definite contribution to the aircraft industry.

Having thus disclosed my invention, I do not wish to be limited to the precise details of construction disclosed but wish instead to cover those modifications thereof which will occur to those skilled in the art and which are reasonably within the scope of my invention, as described in the appended claims.

I claim:

1. An extreme temperature liner to embrace a metal-strap supporting loop for conduits or wires, comprising: a silicone rubber channel having a laterally concavo-convex base wall, a side wall upstanding at each edge on the convex side of the base wall, each side wall including an instanding lip overlying the convex side of the base wall; said channel having a strip of woven glass fiber fabric pre-impregnated with silicone on both sides to completely fill the interstices and formed to the approximate cross-section of the channel and embedded therein throughout the channel length.

2. A liner according to claim 1 in which the strip of glass fiber fabric is on the bias relative the length of said channel.

3. A liner according to claim 1 in which the silicone rubber has a 70 to 80 durometer hardness, a brittle point below −75° F., and remains serviceable at 500° F.

4. A liner according to claim 1 in which the instanding lips are angularly disposed relative each other to define an obtuse angle facing the convex side of said base wall.

5. A liner according to claim 1 in which the woven glass fiber fabric is oriented in said channel in closer proximity to said convex surface than to said concave surface.

References Cited in the file of this patent

UNITED STATES PATENTS

| | | |
|---|---|---|
| 1,581,777 | Beynon | Apr. 20, 1926 |
| 2,387,295 | Robertson | Oct. 23, 1945 |
| 2,525,070 | Greenwald | Oct. 10, 1950 |
| 2,686,745 | De Matteo | Aug. 17, 1954 |
| 2,709,558 | Young | May 31, 1955 |